United States Patent [19]

Ruter

[11] Patent Number: 5,051,873
[45] Date of Patent: Sep. 24, 1991

[54] COMBINED HEADLIGHT AND WINDSHIELD WIPER CONTROL

[76] Inventor: Lewis L. Ruter, 919 W. Broadway, Minneapolis, Minn. 55411

[21] Appl. No.: 615,355

[22] Filed: Nov. 6, 1990

[51] Int. Cl.$^5$ ............................................. B60Q 1/00
[52] U.S. Cl. ..................................... 362/61; 362/80.1; 362/802; 315/82
[58] Field of Search .................. 362/61, 80, 253, 802, 362/80.1; 315/82, 83

[56] References Cited

U.S. PATENT DOCUMENTS

| | | | |
|---|---|---|---|
| 3,500,119 | 3/1970 | Price | 315/82 |
| 3,519,837 | 7/1970 | Nolin et al. | 315/82 |
| 3,600,596 | 8/1971 | Alolsantoni | 315/82 |
| 3,824,405 | 7/1974 | Glaze | 315/82 |
| 4,010,380 | 3/1977 | Bailer et al. | 315/82 |
| 4,956,562 | 9/1990 | Benedict et al. | 315/82 |
| 4,985,660 | 1/1991 | Cronk | 315/82 |

FOREIGN PATENT DOCUMENTS 2064238 6/1981 United Kingdom ................. 362/61

Primary Examiner—Ira S. Lazarus
Assistant Examiner—Sue Hagarman
Attorney, Agent, or Firm—Burd, Bartz & Gutenkauf

[57] ABSTRACT

A vehicle windshield wiper and headlight control that only allows operation of the windshield wipers when the headlights are ON has a wiper control switch and a headlight switch connected to a battery, wiper motor, and headlights. The headlight switch has a pair of switches that are concurrently closed with a movable actuator so that the wiper motor only operates when the headlights are ON. An indicator light is associated with the headlight switch to advise the vehicle operator that the headlights must be ON before the windshield wipers can be operated.

23 Claims, 3 Drawing Sheets

COMBINED HEADLIGHT AND WINDSHIELD WIPER CONTROL

TECHNICAL FIELD

The invention is in the field of motor vehicle electrical systems that control the operation of the headlights and windshield wipers of a vehicle such as an automobile, truck, tractor and like highway vehicles.

BACKGROUND OF THE INVENTION

Motor vehicles have been for many years equiped with headlights and windshield wipers to fascilitate the observation of the roadway by the operator of the vehicle. Electrical and vacuum control systems have been used to operate the windshield wipers independant of the headlights. It is a common safetly practice to have the headlights turned on during inclement weather conditions such as rain, fog, hail, snow, sleet, mist and the like. The switches and controls for operating the headlights are separate and independant from the controls for the windshield wipers. This allows the operator of the vehicle to use the windshield wipers with the headlights OFF. A conscious effort must be made to turn the headlights ON in daylight conditions during inclement weather. Some vehicle operators inadvertantly leave the headlights ON after the vehicle has been parked. This will discharge the battery over an extended period of time and eventually result in a dead battery. The laws of some states require that the headlights of the vehicle be turned ON when the windshield wipers are operated. The operator of the vehicle must separately operate the windshield wiper controls and the headlight controls to achieve operation of the windshield wipers with the headlights ON.

SUMMARY OF INVENTION

The invention is directed to a combined windshield wiper and headlight control system that will allow operation of the windshield wipers when the headlights of the vehicle are ON. The control system operates through the switch for the headlights of the vehicle. The headlight switch must be turned ON to allow the windshield wipers to operate.

In one embodiment of the combined windshield wiper and headlight control for a vehicle, the control includes a first switch that is operable to control the operation of the windshield wipers. This switch is connected to a power source such as a battery and an electric motor that operates the windshield wipers. A second switch operable to selectrively turn the headlights ON and OFF is connected to the power source and the headlights. The second switch includes a pair of switches that separately control the headlights and the motor for the windshield wipers. Both of the pair of switches are normally open so that when the headlights are OFF the windshield wipers are inoperative. The second switch has an actuator which when moved to its ON position closes both the headlight and wiper switches so that the windshield wipers operate only during the time that the headlights are ON. When the actuator for the second switch is moved from the ON position to the OFF position, the headlights will be turned OFF and the operation of the windshield wipers will be terminated. An indicator incorporated into the second switch is used to provide a visual or sound signal which advises the operator that the first switch for the windshield wipers is inoperative during the time that the second switch for the headlights is OFF. Once the second switch is turned ON the indicator signal is terminated due to concurrent operation of the windshield wipers and the headlights.

In another embodiment of the invention the wiper control switch is provided with an indicator that advises the operator of the vehicle that the windshield wipers are operating with the headlights OFF. When the headlight switch is turned to the ON position the indicator is turned OFF or extinguished whereby the windshield wipers are operating at the time that the headlights are turned ON.

The combined windshield wiper and control system of the invention is automatic and operation in that it provides for the simultaneous operation of the windshield wipers only when the headlights of the vehicle are ON. The control system is easy to install and has a relatively low cost which provides a substantial enhancement of the safe operation of the vehicle.

DESCRIPTION OF DRAWING

FIG. 4 is an enlarged sectional view of the headlight light switch shown in FIG. 3.

DESCRIPTION OF PREFERRED EMBOIDMENTS

Figure 1:
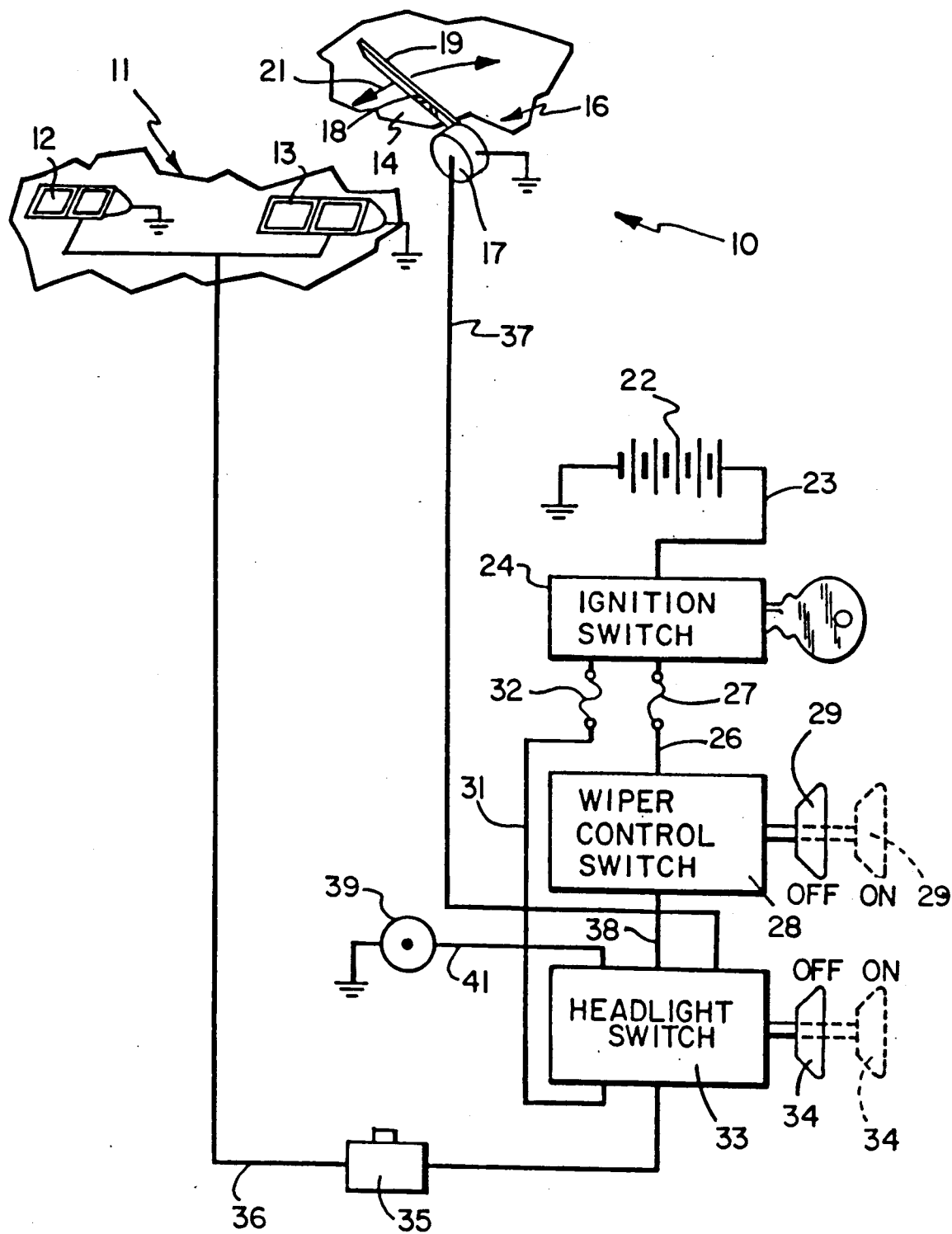
FIG. 1 is a diagramatic view of the combined headlight and windshield wiper control of the invention.

Referring to FIG. 1 there is shown a front of vehicle 10, such as an automobile, truck, tractor or the like, having a front grill 11 supporting a pair of headlights 12 and 13. A windshield 14 is located above headlights 12 and 13.

A wiper assembly, indicated generally at 16, is used to clear windshield 14 of rain, snow and like particulate materials. The wiper assembly 16 conventionally has a pair of wiper blades that are operated with an electric motor 17. Each wiper blade is operatively connected to motor 17 with an arm to reciprocate a wiper blade 19, as indicated by the arrow 21, to clear windshield 14. The linkage that operatively connects wiper motor 17 with the wiper blade is conventional structure and does not form part of the invention.

Vehicle battery 21 is connected with a cable 23 to the ignition switch 24. An electrical conductor line 26 having a fuse 27 connects ignition switch 24 to wiper control switch 28. Switch 28 has an on/off control or actuator 29 to control the operation as well as the speed of wiper assembly 16. Wiper control switch 28 is a conventional switch that may be operated in response to either reciprocal motion or rotational motion of actuator 29.

Ignition switch 24 is also connected with a conductor line 31 having a fuse 32 to a headlight switch 33. Switch 33 can be connected directly to battery 21. Switch 33 has a movable actuator 34 operable to turn the headlight switch ON and OFF. A conductor line 36 having a dimmer/bright switch 35 connects headlight swith 38 to headlights 12 and 13. Headlight switch 33 is also connected with a conductor line 37 to the wiper motor 17. Wiper control switch 28 is further connected with a conductor line 38 to headlight switch 33. An indicator light 39, such as a red lamp, is connected with a conductor line 41 to headlight switch 43. Light 39 will illuminate when the wiper control switch is ON and the headlights switch is OFF. The light 39 indicates to the operator of the vehicle that the headlight switch 33 must be turned ON before the wiper motor 17 will operate the wiper assembly 16. Light 39 is a visual indicator of this condition. A buzzer, voice generator or digital read out can be used in lieu of light 39 to provide the vehicle operator with information indicating that the headlight switch 33 must be turned ON before the wiper assembly 16 can be operated.

Figure 2:
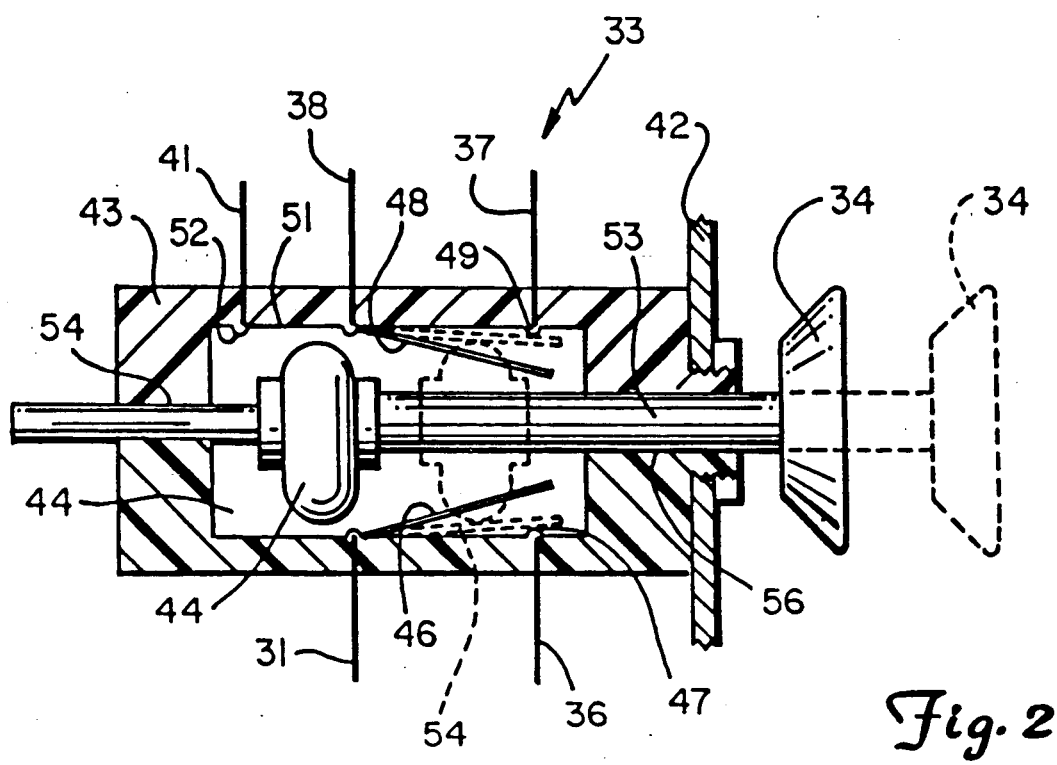
FIG. 2 is an enlarged diagramatic sectional view of the headlight switch shown in FIG. 1.

Referring to FIG. 2, there is shown a diagramatic view of headlight switch 33 mounted on the vehicle dash panel 42. Switch 33 has a casing or body 43 and an internal chamber 44. A first switch located within chamber 44 is connected to line 31 that is operable to engage a contact 47 joined to line 36. First switch 46 is normally open when actuator 34 is in the OFF position. Opposite the first switch 46 is a second switch 48 connected to line 38. Second switch 48 is adapted to engage a contact 49 joined to line 37. Second switch 48 is normally in the open position when switch actuator switch is in the OFF position shown in full lines.

A third switch 51 is also connected to line 38. Third switch 51 is adapted to engage a contact 52 joined to line 41. Switch 51 is in a normally closed position when the actuator 34 is in the OFF position. When switch 28 is turned ON the circuit to light 39 is closed whereby the light is turned ON indicating that the wiper assembly 16 will not operate unless headlight switch 33 is also turned ON.

Switch actuator 34 has an elongated rod 53 that is slideably mounted on casing 43. Rod 53 has opposite ends located through bores 56 and 57 in housing 43. Detent structures (not shown) associated with rod 53 can be used to indicate the stop ON and stop OFF positions of the actuator 34.

Figure 3:
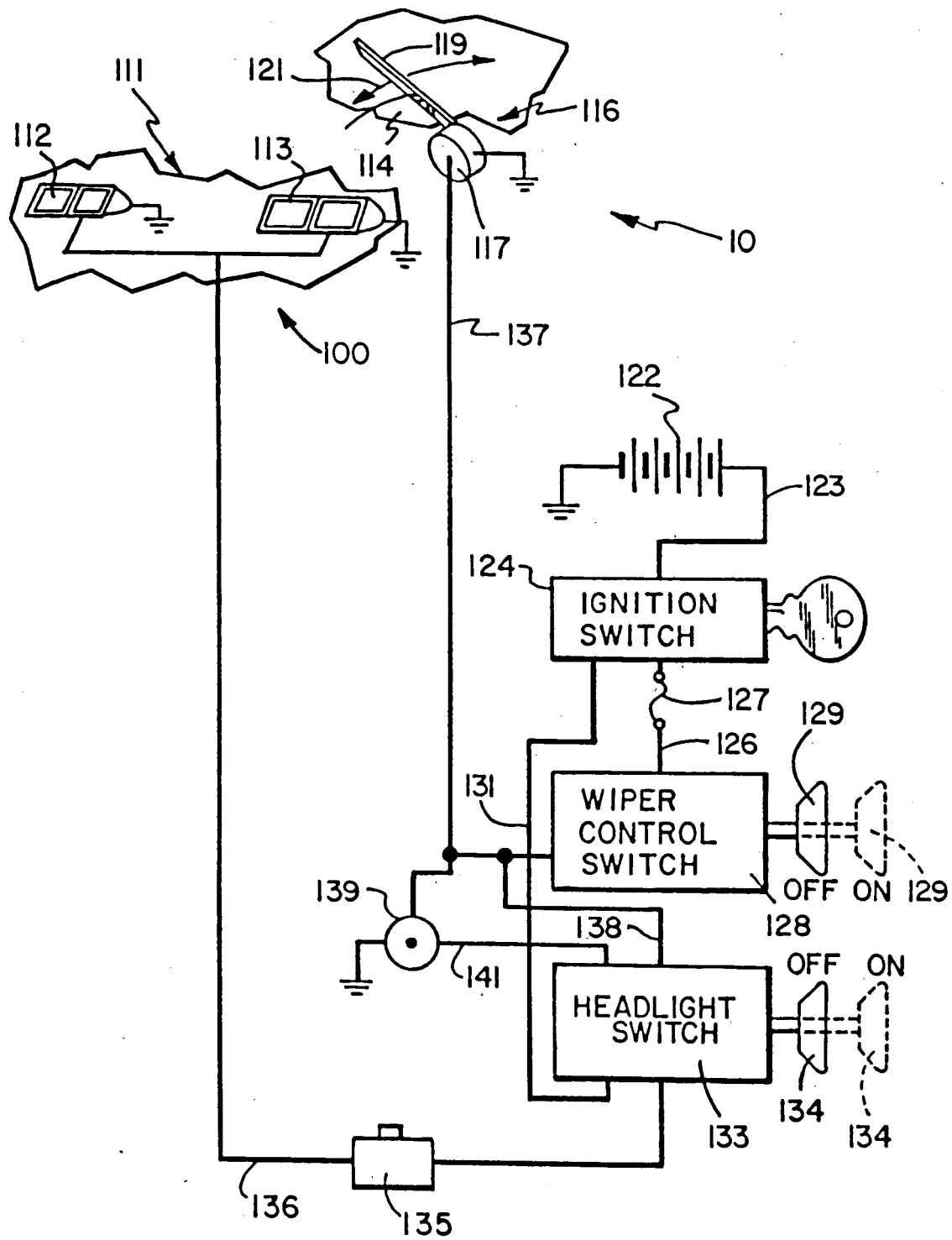
FIG. 3 is a diagramatic view of a modified headlight and windshield wiper control.

Referring to FIG. 3, there is shown a modification of the vehicle headlight and windshield wiper control of the invention incorporated into a vehicle 100, such as an automobile, truck, tractor and the like. Vehicle 100 has a front grill 111 accomodating a pair of headlights 112 and 113. A windshield 114 located above the front grill 111 is cleaned with a windshield wiper assembly indicated generally at 116. Wiper assembly 116 can have a pair of wiper blades that reciprocate across the windshield 114 to remove water, snow, ice and foreign matter from windshield 114. Wiper assembly 116 is operated with an electric motor 117. An arm 118 is connected to the drive mechanism for motor 117. The wiper blade 119 is usually mounted on the end of arm 118 and engageable to the outside surface of windshield surface 114. On operation of motor 117, arm 118 reciprocates as indicated by arrow 121 thereby moving blade 119 relative to windshield 114.

Vehicle 100 has a battery 122 connected with a cable 123 to an ignition switch 124. An electrical conductor line 126 having a fuse 127 is joined to the conventional wiper control switch 128. A second conductor line 137 connects switch 128 to the wiper motor 117. When ignition switch 124 is ON and the wiper actuator 129 is moved to the ON position, indicated in broken lines, motor 117 operates wiper assembly 116. Ignition switch 124 is connected with a conductor line 131 to a headlight control switch 133 having a moveable actuator 134. Switch 133 can be connected directly to battery 122. A dimmer/bright switch 135 is located in a conductor line 136 connecting switch 133 to headlights 112 and 113. Switch 133 is connected with conductor lines 138 and 141 to conductor line 127 leading to the wiper motor 117. A light 139 is located in line 141. Light 139 can be replaced with a buzzer, voice generator or a digital readout which indicates to the vehicle operator that wiper assembly 116 is operating when headlights 112 and 113 are OFF. The operator of the vehicle is then aware that the light control switch 133 should be turned on so that headlights 112 and 113 are ON at the same time that the wiper assembly 116 operates.

Referring to FIG. 4, wiper control switch 133 is mounted on the dash/panel 143 of the vehicle providing convenient operator access to the actuator 134. Switch 133 has a casing or housing 143 having an internal chamber 144. A first switch 146 within chamber 144 is connected to line 131 and operable to engage a contact 147 joined to line 136. Switch 146 is normally open when the actuator 134 is in the OFF position. Movement of the actuator 34 to the ON position will close switch 146. Opposite first switch 146 is a second switch 148 connected to line 138 and operable to engage a contact 149 joined to line 141. Switch 148 is normally closed when the actuator 134 is in the OFF position. In the event that the wiper switch 128 is turned ON thereby operating the wiper assembly 116, the electric circuit to light 139 is closed so that the light will be ON to tell the operator to turn on the headlights. Switch 148 will open when actuator 134 is moved to the ON position as shown in broken lines. When switch 148 is open the light 139 will be OFF indicating that headlights 112 and 113 are ON.

Actuator 134 has a an elongated linear rod 153 that is slideably located in bores 156 and 157 in opposite ends of housing 143. The middle portion of rod 153 carries a head 154 adapted to engage and operate the switches 146 and 148.

In use when the light control switch 143 is in the OFF position the second switch 148 is closed. Light 139 will be OFF if the wiper control switch 128 is OFF. When wiper control switch 128 is moved to the ON position, the wiper assembly 116 will operate to clear the windshield. The light 139 will be ON to indicate to the operator that the windshield wipers are operating with the headlights OFF. The operator then can move the light switch actuator to the ON position to turn the headlights 112 and 113 ON so that headlights 112 and 113 are ON during the time that the windshield wipers are operating. When switch 134 is moved to the ON position the second switch 148 will open thereby terminating the power to the light 139 since its function of making the operator aware that the headlights are not ON has been completed.

While there has been shown and described preferred embodiments of the headlight and windshield wiper control of the invention is understood that changes in the structure, electrical circuits and components of the circuit may be made by those skilled in the art without departing from the invention. The invention is defined in the following claims.

I claim:

1. A control apparatus for connecting a power source to vehicle headlights and to motor means to operate the windshield wipers of the vehicle comprising: a first switch means operable to control the operation of the motor means to operate the windshield wipers, first conductor means connecting the first switch means to the power source, a second switch means operable to selectively turn the headlights ON and OFF, second conductor means connecting the first and second switch means, third conductor means connecting the second switch means to the power source, fourth conductor means connecting the second switch means to the motor means to operate the windshield wipers, fifth conductor means connecting the second switch means to the headlights, said second switch means including a first switch moveable between open and closed positions to selectively connect and disconnect the power source to the headlights, a second switch moveable between open and closed positions to selectively connect and disconnect the power source to the motor means to operate the windshield wipers, and actuator means movable to a first position to concurrently close both the first and second switches whereby the windshield wipers are operated during the time that the headlights are ON when the first switch means is ON.

2. The apparatus of claim 1 including: vehicle ignition switch means connected to the power source and the first and second switch means.

3. The apparatus of claim 1 wherein: the first switch is operable to electrically couple the third and fifth conductor means whereby when the first switch is ON the headlights are ON.

4. The apparatus of claim 1 wherein: the second switch is operable to electrically couple the second and third conductor means to operate the means to operate the windshield wipers.

5. A control apparatus for connecting a power source to vehicle headlights and to motor means to operate the windshield wipers of the vehicle comprising: a first switch means operable to control the operation of the motor means to operate the windshield wipers, first conductor means connecting the first switch means to the power source, a second switch means operable to selectively turn the headlights ON and OFF, second conductor means connecting the first and second switch means, third conductor means connecting the second switch means to the power source; fourth conductor means connecting the second switch means to the motor means to operate the windshield wipers, fifth conductor means connecting the second switch means to the headlights, said second switch means including a first switch moveable between open and closed positions to selectively connect and disconnect the power source to the headlights, a second switch moveable between open and closed positions to selectively connect and disconnect the power source to the motor means to operate the windshield wipers, actuator means movable to a first position to concurrently close both the first and second switches whereby the windshield wipers are operated during the time that the headlights are ON when the first switch means is ON, and indicator means connected to the second switch means to advise the vehicle operator that the second switch means must be ON before the windshield wipers can be operated.

6. The apparatus of claim 5 wherein: the indicator means includes light means and a third switch associated with the second switch means, said third switch being operated in response to movement of the actuator means to close the third switch when the operator means is in the OFF position and to open the third switch when the operator means is in the ON position.

7. The apparatus of claim 5 wherein: the indicator means is a sound generation device which is operational when the actuator means is in the OFF position and the first switch means is ON.

8. A control apparatus for connecting a power source to vehicle headlights and the means to operate the windshield wipers of the vehicle comprising: first means connected to the power source operable in response to at least ON and OFF condition to control the operation of the means to operate the windshield wipers, second means operable to selectively turn the headlights ON and OFF, said second means having actuator means selectively moveable to ON and OFF positions to turn the headlights ON and OFF, and control means connected to the first means operable in response to the operation of the actuator means in the ON position and the first means in the ON condition to actuate the means to operate the windshield wipers whereby the windshield wipers are operated only when the headlights are ON.

9. The apparatus of claim 8 wherein: the first means is a switch operable to control the operation of the means to operate the windshield wipers when the actuator means is in the ON position.

10. The apparatus of claim 8 wherein: the second means is a switch having said actuator means, said switch incuding said control means.

11. The apparatus of claim 10 wherein: the control means is a switch that is open when the actuator means is in the OFF position and closed when the actuator means is in the ON position.

12. The apparatus of claim 8 including: indicator means connected to the second means to advise the vehicle operator that the actuator means of the second means must be ON before the windshield wipers can be operated.

13. The apparatus of claim 12 wherein: the indicator means includes light means and a switch associated with the second means, said switch being operated in response to movement of the actuator means to close the switch when the operator means is in the OFF position and to open the switch when the operator means is in the ON position.

14. The apparatus of claim 12 wherein: the indictor means is a sound generation device which is operational when the actuator means is in the OFF position and the first means is ON.

15. A control apparatus for connecting a power source to vehicle headlights and to motor means to operate the windshield wipers of the vehicle only when the headlights are ON comprising: a first switch means operable to control the operation of the motor means to operate the windshield wipers, first conductor means connecting the first switch means to the power source, second switch means electrically connected to the first switch means operable to connect and disconnect the power source with the headlights and motor means to operate the windshield wipers whereby the headlights and motor means are selectively and concurrently connected to the power source only when the headlights are ON and disconnected to the power source, second conductor means connecting the second switch means to the motor means to operate the windshield wipers, said second switch means having an actuator moveable between ON and OFF positions to control the operation of the headlights and motor means to operate the windshield wipers, and indicator means connected to the second switch means operable to advise the operator that the second switch means must be ON before the windshield wiper motor means will operate the windshield wipers.

16. The apparatus of claim 15 wherein: the second switch means has a switch coupled to the indicator means, said switch being closed when the actuator of the second switch means is in the OFF position.

17. The apparatus of claim 16 wherein: the indicator means includes a light.

18. The apparatus of claim 15 wherein: the indicator means is a sound generator means.

19. The apparatus of claim 15 wherein: the indicator means is a light.

20. A control apparatus for connecting a power source to vehicle headlights and to motor means to operate the windshield wipers of the vehicle only when the headlights are ON comprising: a wiper switch operable to control the speed of operation of the motor means to operate the windshield wipers, first conductor means connecting the wiper switch to the power source, a headlight switch operable to connect and disconnect the power source with the headlights and the motor means to operate the windshield wipers whereby the headlights and motor means are selectively and concurrently connected to the power source so that the motor means operates the windshield wipers only when the headlights are ON and disconnected to the power source, second conductor means connected the wiper switch to the headlight switch whereby when the wiper switch is ON the headlight switch can control the operation of the motor means for operating the windshield wipers, third conductor means connecting the power source to the headlight switch, and fourth conductor means connecting the headlight switch to the headlights whereby when the headlight switch is ON and the wiper switch is ON the headlights and motor means for the windshield wiper means are concurrently operated.

21. The apparatus of claim 20 including: indicator means connected to the headlight switch operable to advise the operator of the vehicle that the windshield wipers will not operate with the headlights OFF.

22. The apparatus of claim 21 wherein: the indicator means includes a light.

23. The apparatus of claim 21 wherein: the indicator means includes light means and a third switch associated with the headlight switch, said third switch being operated in response to movement of the headlight switch to the OFF position and open the third switch when the headlight switch is in the ON position.

* * * * *